US012701051B2

(12) United States Patent
Ickin et al.

(10) Patent No.: US 12,701,051 B2
(45) Date of Patent: Aug. 4, 2026

(54) NETWORK NODES AND METHODS FOR HANDLING MACHINE LEARNING MODELS IN A COMMUNICATIONS NETWORK

(71) Applicant: Telefonaktiebolaget LM Ericsson (publ), Stockholm (SE)

(72) Inventors: Selim Ickin, Stocksund (SE); Farnaz Moradi, Stockholm (SE); Junaid Shaikh, Sundbyberg (SE); Jawwad Ahmed, Kista (SE); Xiaoyu Lan, Täby (SE); Valentin Kulyk, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1120 days.

(21) Appl. No.: 17/638,066

(22) PCT Filed: Aug. 28, 2019

(86) PCT No.: PCT/SE2019/050803
§ 371 (c)(1),
(2) Date: Feb. 24, 2022

(87) PCT Pub. No.: WO2021/040588
PCT Pub. Date: Mar. 4, 2021

(65) Prior Publication Data
US 2022/0321424 A1     Oct. 6, 2022

(51) Int. Cl.
*H04L 41/12*          (2022.01)
*G06N 20/00*          (2019.01)
(52) U.S. Cl.
CPC ............. *H04L 41/12* (2013.01); *G06N 20/00* (2019.01)

(58) Field of Classification Search
None
See application file for complete search history.

(56) References Cited

U.S. PATENT DOCUMENTS 8,214,308 B2 *   7/2012   Chu ......................... G06N 5/02
                                                                706/14
9,413,779 B2 *   8/2016   Vasseur .................. G06N 20/00
                (Continued)

FOREIGN PATENT DOCUMENTS

WO          2018101862 A1      6/2018
WO          2018213205 A1      11/2018

OTHER PUBLICATIONS

Pan, Xudong et al. TAFA: A Task-Agnostic Fingerprinting Algorithm for Neural Networks. In: Lecture Notes in Computer Science, vol. 12972. Sep. 30, 2021, Springer. <https://doi.org/10.1007/978-3-030-88418-5_26> (Year: 2021).*
(Continued)

*Primary Examiner* — Tamara T Kyle
*Assistant Examiner* — Tyler Schallhorn
(74) *Attorney, Agent, or Firm* — Weisberg I.P. Law, P.A.

(57)          ABSTRACT

Embodiments herein disclose, e.g., a method performed by a control network node in a communications network for handling machine learning (ML) models in the communications network. The control network node determines whether or not to transmit to a network node in the communications network a ML model based on a signature and/or a loss value of the network node, wherein the signature and/or the loss value is related to ML modelling. In case where it is determined to transmit, the control network node transmits the ML model to the network node.

10 Claims, 8 Drawing Sheets

(56) References Cited

U.S. PATENT DOCUMENTS

| | | | | |
|---|---|---|---|---|
| 10,353,685 | B2 * | 7/2019 | Patton | G06F 8/60 |
| 10,387,799 | B2 * | 8/2019 | Mahler | G06N 20/20 |
| 10,657,447 | B1 * | 5/2020 | McDonnell | G06N 3/082 |
| 10,936,704 | B2 * | 3/2021 | Mehta | G06F 21/316 |
| 10,949,764 | B2 * | 3/2021 | Shao | G06N 20/00 |
| 11,205,138 | B2 * | 12/2021 | Shaikh | G06N 5/02 |
| 11,281,993 | B2 * | 3/2022 | Susskind | G06N 5/02 |
| 11,394,732 | B1 * | 7/2022 | Kenemer | H04L 63/1416 |
| 11,461,690 | B2 * | 10/2022 | Szeto | G06N 20/10 |
| 11,586,989 | B2 * | 2/2023 | Bos | G06N 20/20 |
| 11,677,634 | B1 * | 6/2023 | Nookula | H04L 41/0816 |
| | | | | 370/254 |
| 11,720,813 | B2 * | 8/2023 | Babu | G06N 20/20 |
| | | | | 706/12 |
| 11,763,154 | B1 * | 9/2023 | Lupesko | G06F 18/214 |
| | | | | 706/12 |
| 11,972,408 | B2 * | 4/2024 | Rouhani | G06F 21/16 |
| 2009/0106178 | A1 * | 4/2009 | Chu | G06N 5/02 |
| | | | | 706/14 |
| 2009/0240539 | A1 * | 9/2009 | Slawson | G06N 20/00 |
| | | | | 705/7.29 |
| 2015/0193693 | A1 * | 7/2015 | Vasseur | G06N 3/02 |
| | | | | 706/12 |
| 2017/0206451 | A1 * | 7/2017 | Mahler | G06N 20/00 |
| 2018/0018590 | A1 * | 1/2018 | Szeto | G16H 10/60 |
| 2018/0157992 | A1 * | 6/2018 | Susskind | G06N 20/00 |
| 2018/0293498 | A1 | 10/2018 | Campos et al. | |
| 2019/0065979 | A1 * | 2/2019 | Shao | G06N 20/00 |
| 2019/0102700 | A1 * | 4/2019 | Babu | G06N 20/00 |
| 2019/0147357 | A1 * | 5/2019 | Erlandson | G06N 3/08 |
| | | | | 706/12 |
| 2019/0171428 | A1 * | 6/2019 | Patton | G06F 8/60 |
| 2019/0213502 | A1 * | 7/2019 | Navratil | G06N 20/00 |
| 2019/0213503 | A1 * | 7/2019 | Navratil | G06F 9/541 |
| 2019/0238443 | A1 | 8/2019 | Di Pietro et al. | |
| 2019/0258783 | A1 * | 8/2019 | Mehta | G06N 20/00 |
| 2019/0294927 | A1 * | 9/2019 | Guttmann | G10L 15/065 |
| 2019/0294982 | A1 * | 9/2019 | Guttmann | G06V 20/20 |
| 2020/0160207 | A1 * | 5/2020 | Song | G06F 11/3466 |
| 2020/0175378 | A1 * | 6/2020 | McDonnell | G06N 3/045 |
| 2020/0372398 | A1 * | 11/2020 | Shaikh | G06N 20/10 |
| 2021/0019605 | A1 * | 1/2021 | Rouhani | G06N 3/045 |
| 2021/0019661 | A1 * | 1/2021 | Bos | G06N 3/045 |
| 2021/0073685 | A1 * | 3/2021 | Veshchikov | G06F 21/56 |
| 2021/0150397 | A1 * | 5/2021 | Salkeld | G06N 20/20 |
| 2022/0230024 | A1 * | 7/2022 | Kallianpur | G06F 18/285 |

OTHER PUBLICATIONS

Zhang, Jie et al. REEF: Representation Encoding Fingerprints for Large Language Models. Oct. 18, 2024, Cornell University. <https://doi.org/10.48550/arXiv.2410.14273> (Year: 2024).*

Wu, Jiaxuan et al. ImF: Implicit Fingerprint for Large Language Models. Aug. 23, 2025, Cornell University. <https://doi.org/10.48550/arXiv.2503.21805> (Year: 2025).*

Ye, Peigen et al. Securing Large Languages Models: A Survey of Watermarking and Fingerprinting Techniques. In: ACM Computing Surveys, vol. 58, issue 7. Feb. 4, 2026, Association for Computing Machinery. <https://doi.org/10.1145/3773028> (Year: 2026).*

International Search Report and Written Opinion dated Jul. 14, 2020 for International Application No. PCT/SE2019/050803 filed Aug. 28, 2019, consisting of 12-pages.

Mowei Wang et al.; Machine Learning for Networking: Workflow, Advances and Opportunities; IEEE Network, vol. 32, No. 2; Mar./Apr. 2018, consisting of 8-pages.

Jasmina Bogojeska et al.; Transfer Learning for Server Behavior Classification in Small IT Environments; NOMS 2018—IEEE/IFIP Network Operations and Management Symposium, 2018, consisting of 9-pages.

European Search Report dated Jul. 29, 2022 for Application No. 19943596.7, consisting of 11 pages.

"Identifying and Determining Trustworthiness of a Machine-Learned Model"; An IP.com Prior Art Technical Disclosure; Jan. 5, 2018, consisting of 35 pages.

* cited by examiner

201. Obtain signature and/or loss value

202. Signature/Loss value

203. Compare signature and/or loss value with stored signature and/or loss value 204. Determine whether or not to transmit ML model 205. ML model 206. Train ML model

NETWORK NODES AND METHODS FOR HANDLING MACHINE LEARNING MODELS IN A COMMUNICATIONS NETWORK

CROSS-REFERENCE TO RELATED APPLICATION

This application is a Submission Under 35 U.S.C. § 371 for U.S. National Stage Patent Application of International Application Number: PCT/SE2019/050803, filed Aug. 28, 2019 entitled "NETWORK NODES AND METHODS FOR HANDLING MACHINE LEARNING MODELS IN A COMMUNICATIONS NETWORK," the entirety of which is incorporated herein by reference.

TECHNICAL FIELD

Embodiments herein relate to methods, a network node, and a control network node in a communications network. In particular, embodiments herein relate to handling machine learning models in the communications network.

BACKGROUND

Computational graph models such as machine learning models are currently used in different applications and are based on different technologies. A computational graph model is a directed graph model where nodes correspond to operations or variables. Variables may feed their value into operations, and operations may feed their output into other operations. This way, every node in the graph model defines a function of the variables. Training of these computational graph models is typically an offline process, meaning that it usually happens in datacenters and takes several minutes to hours and days, depending on the underlying technology, the capabilities of the infrastructure used for training and the complexity of the computational graph model, e.g. amount of input data, parameters, etc. On the other hand, execution of these computational graph models is done anywhere from an edge of the communication network also called network edge, e.g. in devices, gateways or radio access infrastructure, to centralized clouds e.g. data centers.

A set of machine learning (ML) models may be trained and deployed on a group of elements with some computing resources such as network devices, dedicated server in a data center (DC), edge devices etc. But most of these environments are quite dynamic with varying loads and traffic patterns over time as well as addition and/or removal of elements. For example, when a new element such as a network device is added, or an existing one has changed, usually there is not enough data to train an ML model from scratch. The data collection and training of a new ML model may be time- and energy-consuming and costly particularly when these ML models are supposed to run in dynamic environments.

Another example of element can be a network node like a radio base station with ML model running on it. In that case the change in the transport load of the radio cells may result in poor performance of the ML model used. However, there is a strong possibility that there exists another network node at the same time with similar hardware and/or software specification and characteristics and that may experience a same type of transport load and generating similar data e.g. performance counters or logs.

Creating a new ML model for a network node requires data collection, e.g., by running some experiments, collecting measurements data, and then training and evaluating the model. This process may be time- and energy-consuming and costly. One existing approach to address this problem is to use training data from other network nodes. A challenge is to perform a server behavior prediction in small data centers where very few training examples exists for building a proper model, since the distribution of problematic and/or normal servers is highly skewed. An approach may be to combine training examples from several small data centers into one pool of training samples. A model for the new domain may then be built based on samples from all small data centers that resembles the target domain. This may be time and resource consuming.

SUMMARY

An object of embodiments herein is to provide an ML model concept in a secure and efficient manner.

According to an aspect of embodiments herein, the object is achieved by a method performed by a control network node in a communications network for handling ML models in the communications network comprising one or more network nodes. The control network node determines whether or not to transmit to a network node in the communications network a ML model, based on a signature and/or a loss value of the network node, wherein the signature and/or the loss value is related to ML modelling. The control network node, in case determined to transmit, transmits the ML model to the network node.

According to a further aspect of embodiments herein, the object is achieved by providing a method performed by a network node in a communications network for handling ML models in a ML model architecture. The network node obtains a signature and/or a loss value of the network node, wherein the signature and/or the loss value is related to a first ML model comprised in the network node. The network node further transmits the obtained signature and/or the loss value to a control network node.

According to another aspect of embodiments herein, the object is achieved by providing a control network node in a communications network for handling ML models in the communications network comprising one or more network nodes. The control network node is configured to determine whether or not to transmit to a network node in the communications network a ML model, based on a signature and/or a loss value of the network node, wherein the signature and/or the loss value is related to ML modelling. The control network node further configured, in case determined to transmit, to transmit the ML model to the network node.

According to another aspect the object is achieved by providing a network node for handling ML models in a ML model architecture, wherein the network node is configured to obtain a signature and/or a loss value of the network node, and wherein the signature and/or the loss value is related to a first ML model comprised in the network node. The network node is further configured to transmit the obtained signature and/or the loss value to a control network node.

It is furthermore provided herein a computer program product comprising instructions, which, when executed on at least one processor, cause the at least one processor to carry out the method above, as performed by the control network node or the network node, respectively. It is additionally provided herein a computer-readable storage medium, having stored thereon a computer program product comprising instructions which, when executed on at least one processor, cause the at least one processor to carry out the method according to the methods above, as performed by the control network node or the network node, respectively.

Some existing methods require moving data from different network nodes in the communications network which might not be possible due to privacy issues or due to limited bandwidth for transmitting data particularly when large geographic distances are involved. Other approaches are transfer and federated learning, but then the ML models still need an initial training phase, which is time consuming, and sometimes impossible due to lack of data. Embodiments herein enable seamless handover of already trained ML models to most suitable environments for rapid inference tasks, where multiple network nodes are involved. Embodiments herein allow reuse of already trained models for the newly added or modified network nodes in the communications network. It is herein disclosed a solution based on change detection and similarity check using signatures or loss value of ML models.

Embodiments herein provide one or more advantages such as: rapid inference, avoiding slow start caused by the model training from scratch; utilizing a similar model if one already exists also leads to lower resource and energy consumption; no need to move collected data to a centralized location for model training, which reduces data traffic overload and avoids privacy and security issues; highly adaptive to dynamic system and environment with reduced training time; and lower resource requirements for training is an ideal match for the resource-constrained elements, e.g. at network edge.

BRIEF DESCRIPTION OF THE DRAWINGS

Examples of embodiments herein are described in more detail with reference to attached drawings in which.

DETAILED DESCRIPTION

Figure 1:
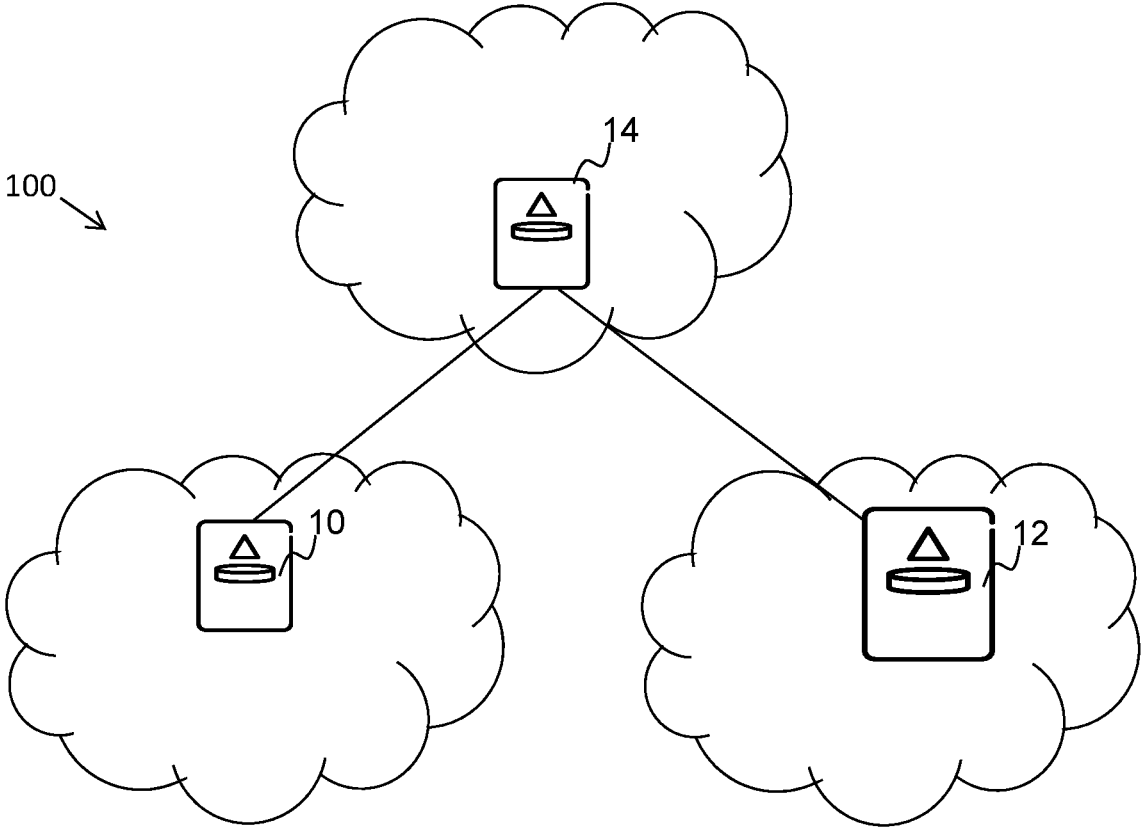
FIG. 1 is a schematic overview depicting a communications network according to embodiments herein.

FIG. 1 is a schematic overview depicting a communications network 100 wherein embodiments herein may be implemented. The communications network 100 comprises one or more RANs and one or more CNs. The communications network 100 may use any technology such as 5G new radio (NR) but may further use a number of other different technologies, such as, Wi-Fi, long term evolution (LTE), LTE-Advanced, wideband code division multiple access (WCDMA), global system for mobile communications/enhanced data rate for GSM evolution (GSM/EDGE), worldwide interoperability for microwave access (WiMax), or ultra mobile broadband (UMB), just to mention a few possible implementations.

Embodiments herein disclose a machine learning (ML) model architecture wherein ML models are comprised in a number of network nodes that operate in the communications network 100. For example, a first network node 10 and a second network node 12, also known as network nodes with agents, or peers, are comprised in the communications network 100. Such a network node may be a cloud based server or an application server providing processing capacity for e.g. executing ML models. The network node may alternatively be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Mobile device to Mobile device (D2D) communication, or any other network unit capable of communicating with a UE within the cell served by the network node depending e.g. on the radio access technology and terminology used.

Furthermore, the communications network 100 may comprise another network node such as a control network node 14 operable to communicate with all network nodes in the communications network.

Embodiments herein relate to seamless handover of the ML models between the network nodes. E.g. when a network node is added to the communications network 100 or existing network nodes' experience a change in the running of the ML model, instead of training a new ML model from scratch, a pre-trained model is selected and used in the network node. The selection of the ML model is done based on quickly calculating similarity of a data distribution, also referred to as signature, in network nodes associated with the existing ML models, i.e. comparing signatures and/or loss value of the ML model. In addition, embodiments herein may further include model adaptability and tuning using transfer learning for example using additional batch training, and may perform fine tuning e.g. comprising modifying a last layer of the ML model, etc.

Figure 2:
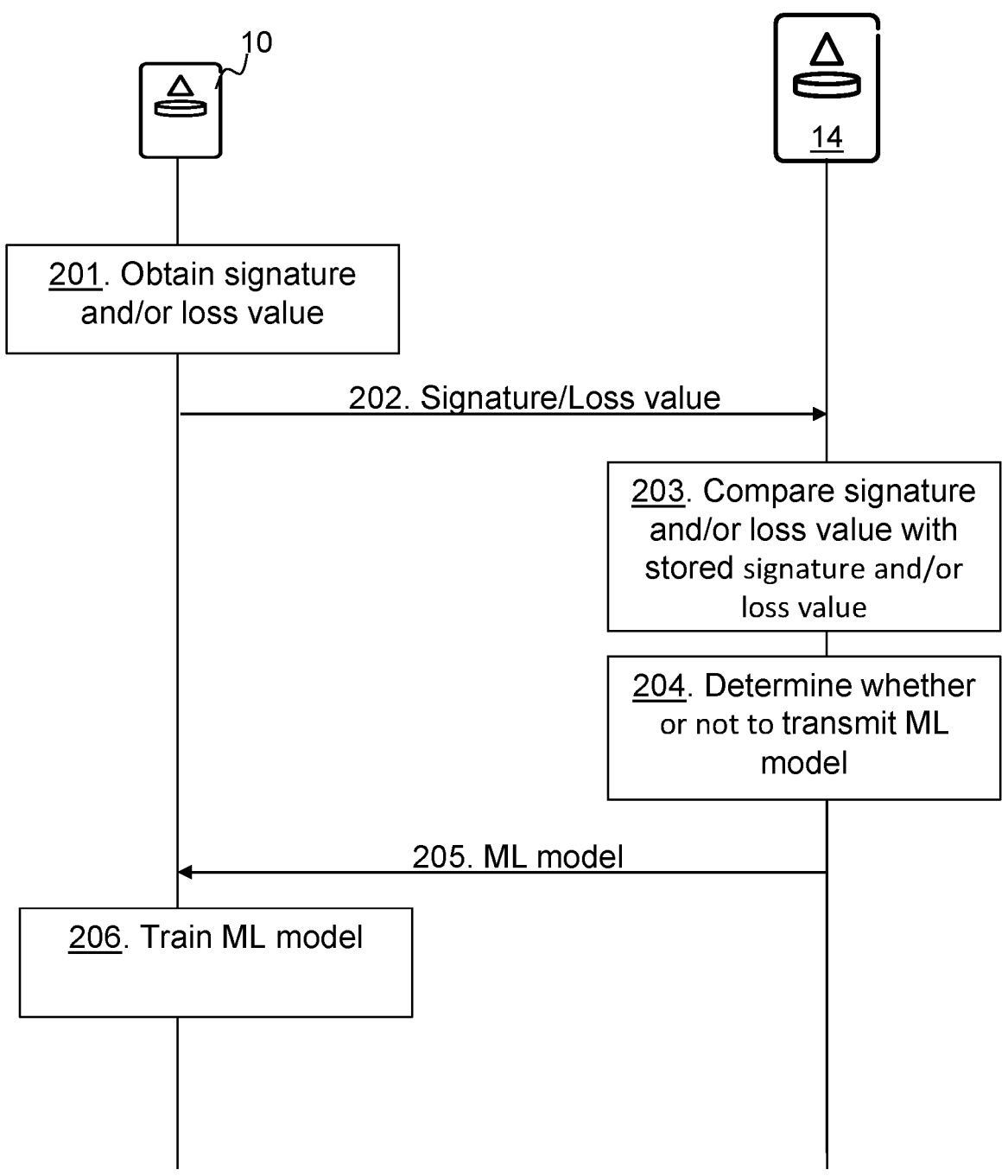
FIG. 2 is a combined signalling scheme and flowchart according to embodiments herein.

FIG. 2 is a combined signalling scheme and flowchart depicting embodiments herein. The network node is exemplified as the first network node 10. It should be noted that new ML models and their signature may be sent to be stored in a signature database. For example, when a network node trains a ML model and the loss value is low, then the network node may send the model and the signature to be stored in the signature database Action 201. The first network node 10 obtains a signature and/or a loss value of the network node, wherein the signature and/or the loss value is related to a first ML model comprised in the first network node 10. The first network node may thus collect the signature of the first ML model and/or determine the loss values of the first ML model.

Action 202. The first network node 10 transmits the signature and/the loss value to the control network node 14. The control network node 14 may thus receive, from the first network node 10, the signature or the loss value of the first ML model.

Action 203. The control network node 14 may then e.g. compare the obtained signature with one or more stored signatures e.g. in a signature database. An ML model may be selected in the comparison as being a most similar ML model in terms of signature similarity from the one or more stored signatures compared to the obtained signature of the first network node 10. The signature may comprise a compressed form of the model. This can be done in many ways including autoencoders where an encoder and a decoder is trained simultaneously. Here the decoder model is able to reconstruct the dataset. Other similarity measure may be the network details such the neurons in the input layer indicating the number of features and types. Other similarity measure may be descriptive statistics, e.g., Gaussian Model of all features that the model uses as input. How similar these distributions from different network nodes can be done via Frechet distance or Chi-squared comparison. Based on pairwise distance (computed by above optional methods), a graph can be generated in between nodes, where the closer nodes than can be clustered. The selected ML model may be a previous model, for transient changes. It should be noted that the control network node 14 may remove ML models from the signature database for ML models that have not been in use by any of the network nodes for a pre-defined amount of time.

Action 204. The control network node 14 determines whether or not to transmit to the first network node 10 in the communications network a ML model based on the signature and/or the loss value of the network node, wherein the signature and/or the loss value is related to ML modelling. E.g. the control network node 14 may, based on the comparison in action 203, determine whether or not to transmit the ML model to the first network node 10. The control network node 14 may in some embodiments receive an indication that the first ML model of the network node has changed. The indication may be a flag indication received from the first network node 10 or another network node in the communications network. The indication may alternatively be received from a change detector or determined at the control network node 14. The loss value may be defined by a difference between the predicted value and the actual value, hence the smaller the difference (loss), the more accurate the model is. Loss metrics may e.g. be mean squared error (MSE), Logloss, or similar.

Action 205. In case the control network node 14 determines to transmit a ML model, the control network node 14 transmits the ML model to the first network node 10. In some embodiments the control network node 14 may determine that the first network node 10 is a network node added to the communications network, and the ML model transmitted to first network node 10 may be selected based on the signature of the first network node 10.

Action 206. The first network node 10 may receive the ML model and may deploy the received ML model. The first network node may further train the received ML model. It should be noted that the first network node 10 may be able to go back to a previous ML model e.g. for transient changes.

Thus, a method is herein provided for seamless ML model handover in dynamically changing environments. The method may be used in the following possible scenarios: when a new network node is added, wherein no ML model exists at the added network node, and/or not enough data or computing resources are available locally for training an ML model from beginning; and/or when an existing network node is changed or an ML model at the network node changes, e.g., due to changes in the environment such as signalling conditions e.g. the performance of the current ML model degrades, i.e. loss value increases indicating an erroneous inference from the ML model and therefore a new ML model needs to be used.

In the context when the training of an ML model for an added network node or when a changed network node requires significantly large number of samples and higher computational power, finding an already trained ML model at the control network node 14 by calculating a similarity between different signatures e.g. data distributions of ML models of different network nodes, is beneficial. For example, given that the labels that the model is supposed to predict is either 1 (fault exists) or 0 (if fault does not exist) and it is assumed that there are 30% 0's, and 70% 1's. There for this distribution can be considered as a signature of one feature in a dataset. It should be noted that it requires smaller number of samples (in most cases only labels) to be able to find the similarity compared to a number of samples typically required for training an ML model from scratch.

Figure 3:
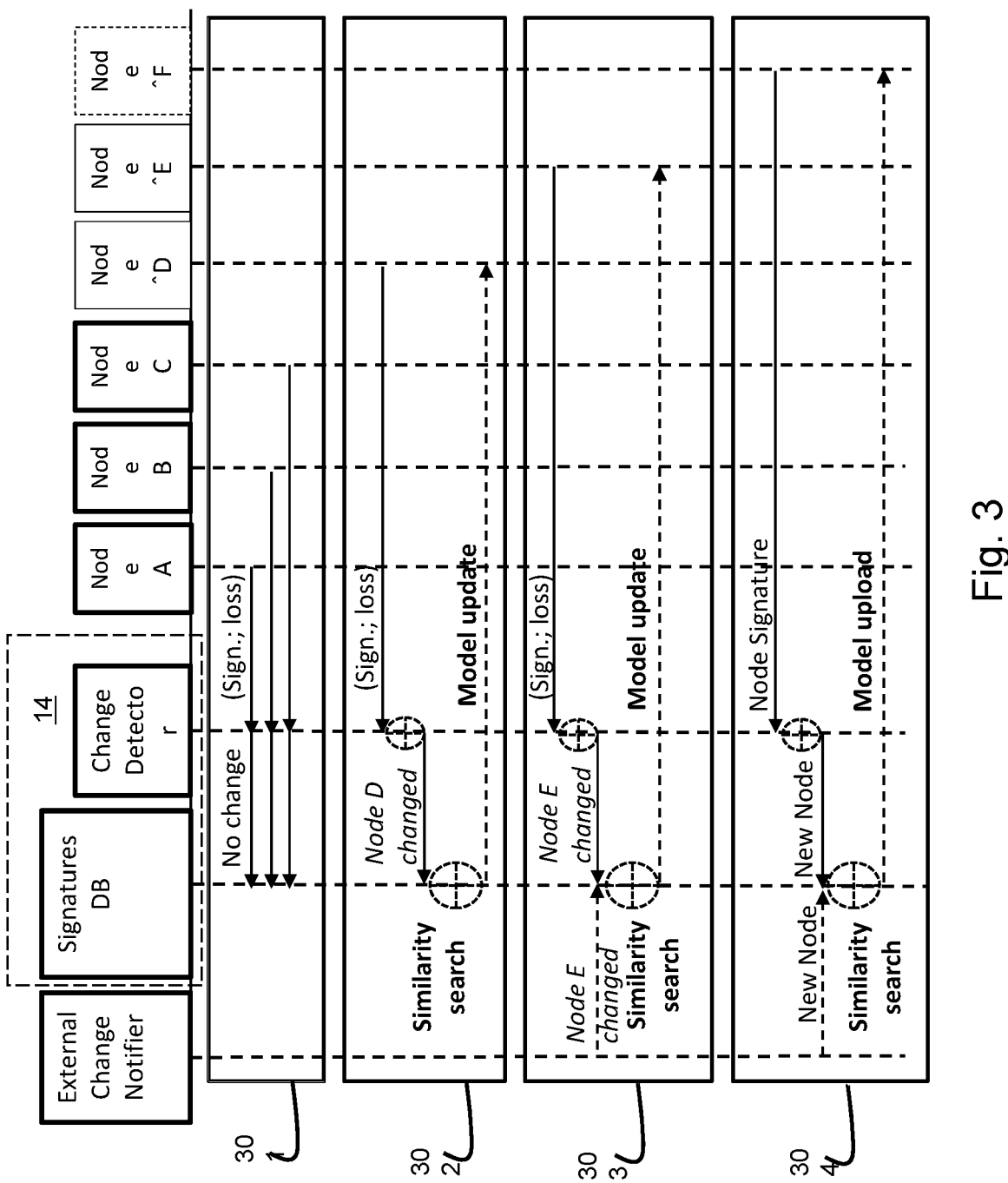
FIG. 3 is a block diagram depicting different scenarios according to embodiments herein.

FIG. 3 shows sequence diagrams of different scenarios for different network nodes according to embodiments herein. It is herein disclosed a method for choosing ML model, e.g. a pre-trained ML model, for a new or changed network node. The network nodes in the communications network 100 are exemplified in FIG. 3 as nodes A-F and are individual network nodes or elements. Nodes D and E have experienced some change in performance of the ML model while Node F is newly added to the communications network 100. Respective network node may determine a signature for the respective network node e.g. by calculating compressed form of available data.

Scenario 301 discloses that the nodes A-C are operating in a normal fashion using the respective ML model. The nodes A-C determine respective signature e.g. by calculating compressed form of available data. Each node may report their signatures and/or loss value to a change detector at the control network node 14. The change detector is illustrated as a stand-alone node but may be part of the controller node 14 as illustrated with the dashed-line box. It should further be noted that a detection functionality may be comprised in the network node e.g. the network node may detect that the loss value has changed and then transmit the changed loss value to the control network node 14. The change detector may determine no change in the reported parameters and may send or provide to the control network node 14 or a signature database (DB) of the control network node 14, an indication that there is no change of parameters, such as signature or loss values, have occurred. It should be noted that the control network node 14 may collect and store signatures of ML models in the communications network from different network nodes.

Scenario 302 discloses that the node D determines its signature e.g. by calculating compressed form of available data, and the loss value. The node D transmits, to the change detector, the signature and the loss value of the ML model at the node D. The change detector then detects that the signature and/or the loss value has changed. The change detector provides an indication that node D has changed, e.g. a change flag, the signature and/or loss value, to the control network node 14. The control network node 14 compares the signature with stored signatures, e.g. at the signature DB, and selects an updated ML model. I.e. the control network node 14 may perform a node similarity search of signatures. The selected ML mode may then be transmitted to the node D.

Scenario 303 discloses that the node E determines its signature e.g. by calculating compressed form of available data and the loss value. The node E transmits, to the change detector, the signature and the loss value of the ML model at the node E. The change detector then detects that the signature and/or the loss value has changed. The change detector provides an indication that node E has changed, e.g. a change flag, the signature and/or loss value, to the control network node 14. Alternatively, the change can be notified directly by an external entity denoted change notifier in FIG. 3. The control network node 14 may then calculate or determine the similarity of the signature with existing signatures in e.g. the signature database. The control network node 14 may then select the most similar pre-trained model for the node E i.e., having the most similar signature from the signature database. I.e. the control network node 14 may perform a node similarity search of signatures. The selected ML mode may then be transmitted to the node E. The node E may further deploy the received ML model and further re-train and/or adapt the ML model update with locally collected data, e.g., using transfer learning, if needed.

Scenario 304 discloses that the node F, added to the communications network, determines its signature e.g. by calculating compressed form of available data. The node F transmits, to the change detector, the signature of the ML model at the node F. E.g. the node F may have enough data to derive its distribution statistically, however the node F may not have enough data to train a ML model (given that ML model may be hard to train with small datasets), although might still have indicative descriptive statistics. Thus, the node F may not have enough data to train a ML model, but some data to create a signature. The change detector then detects that the signature is of a network node added to the communications network. The control network node 14 may then identify whether there is a change in existing data or if the network node is newly added and in that case setting an indication e.g. a new node flag. E.g. the change detector provides the signature and/or a new node flag that node F has been added, to the control network node 14. The control network node 14 may then calculate the similarity of the signature with existing signatures in e.g. the signature database. The control network node 14 may then select the most similar pre-trained model for the node F i.e., having the most similar signature from the signature database. I.e. the control network node 14 may perform a node similarity search of signatures. The selected ML mode may then be transmitted to the node F. The node F may further deploy the received ML model and may further train and/or adapt the ML model update with locally collected data, e.g., using transfer learning, if needed.

Figure 4:
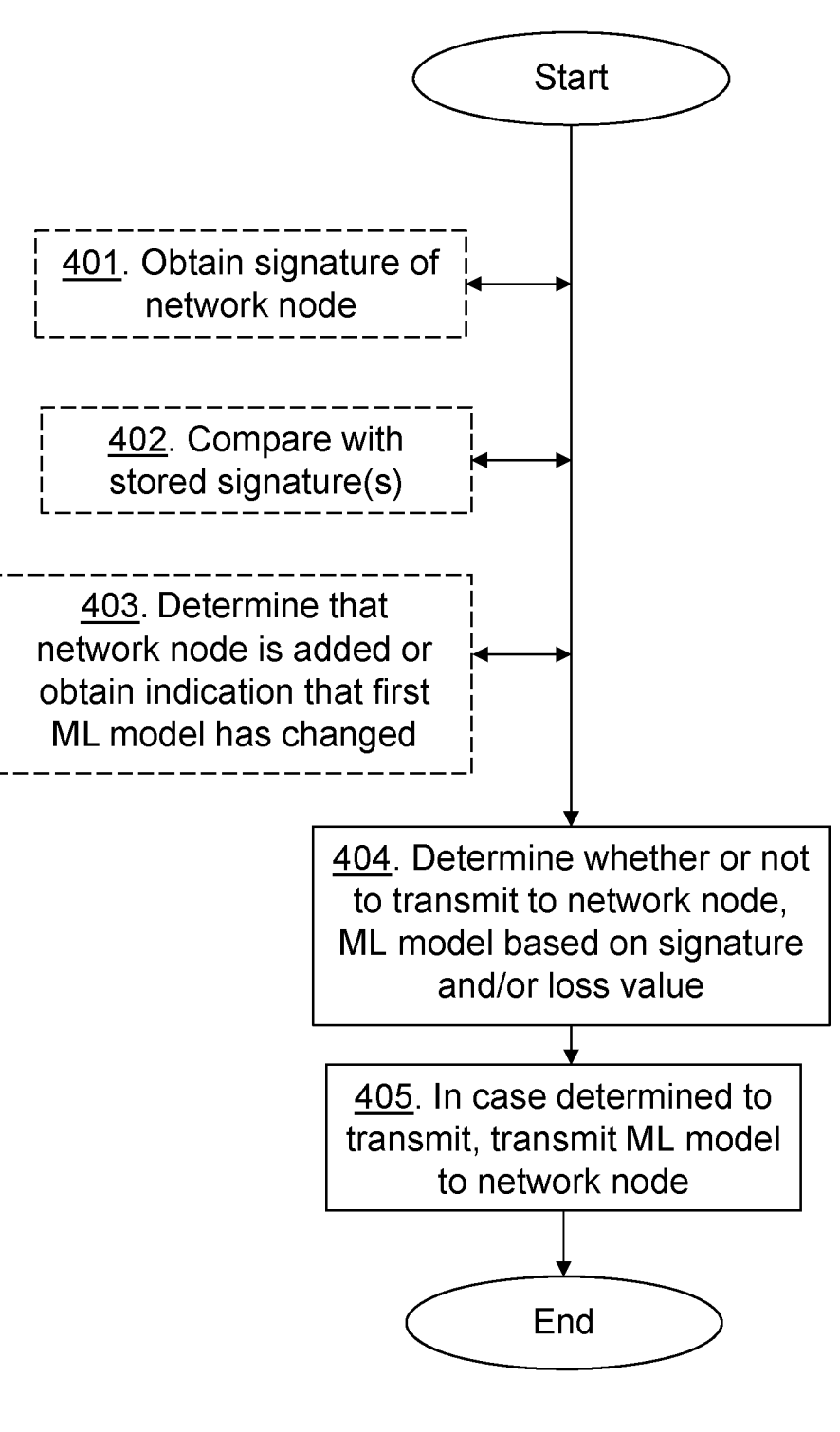
FIG. 4 is a flowchart depicting a method performed by a control network node according to embodiments herein.

The method actions performed by the control network node 14 for handling ML models in the communications network comprising one or more network nodes according to embodiments herein will now be described with reference to a flowchart depicted in FIG. 4. The actions do not have to be taken in the order stated below, but may be taken in any suitable order. Actions performed in some embodiments are marked with dashed boxes.

Action 401. The control network node 14 may obtain the signature of the network node e.g. the first and/or the second network node. E.g. the control network node 14 may receive from the network node or another network node the signature of the network node.

Action 402. The control network node 14 may compare the obtained signature with one or more stored signatures.

Action 403. The control network node 14 may determine that the network node is a network node added to the communications network, and the ML model to be transmitted to network node is selected based on the signature of the network node. Alternatively or additionally, the control network node 14 may obtain an indication that the first ML model of the network node has changed. E.g. the control network node 14 may determine from a detection process within determining that the first ML model of the network node has changed based on loss values of the first ML model. Alternatively or additionally, the control network node 14 may receive a message with a flag or similar from a change detector or from the network node, wherein the flag indicates that the first ML model of the network node has changed. Thus, the indication may be a received flag indication from another network node in the communications network.

Action 404. The control network node 14 determines whether or not to transmit to a network node, such as the first and/or the second network node 12, in the communications network 100 the ML model based on the signature and/or the loss value of the network node. The signature and/or the loss value is related to ML modelling e.g. signature may be data distributions of a local ML model at the network node and loss values may be difference values of inferred values and actual values. The signature may comprise data distribution e.g. input parameters and/or the loss value may be defined by Logloss e.g. (log(predicted)*actual).sum( ) or (predicted-actual)2).sum( ). The control network node 14 may, based on the comparison in action 402, determine whether or not to transmit the ML model to the network node. E.g. the control network node 14** may determine whether or not to transmit the ML model by selecting the ML model based on the comparison. The selected ML model may be a most similar ML model in terms of signature from the one or more stored signatures compared to the obtained signature of the network node.

Action 405. In case the control network node 14 determines to transmit the ML model, the control network node 14 transmits the ML model to the network node.

Figure 5:
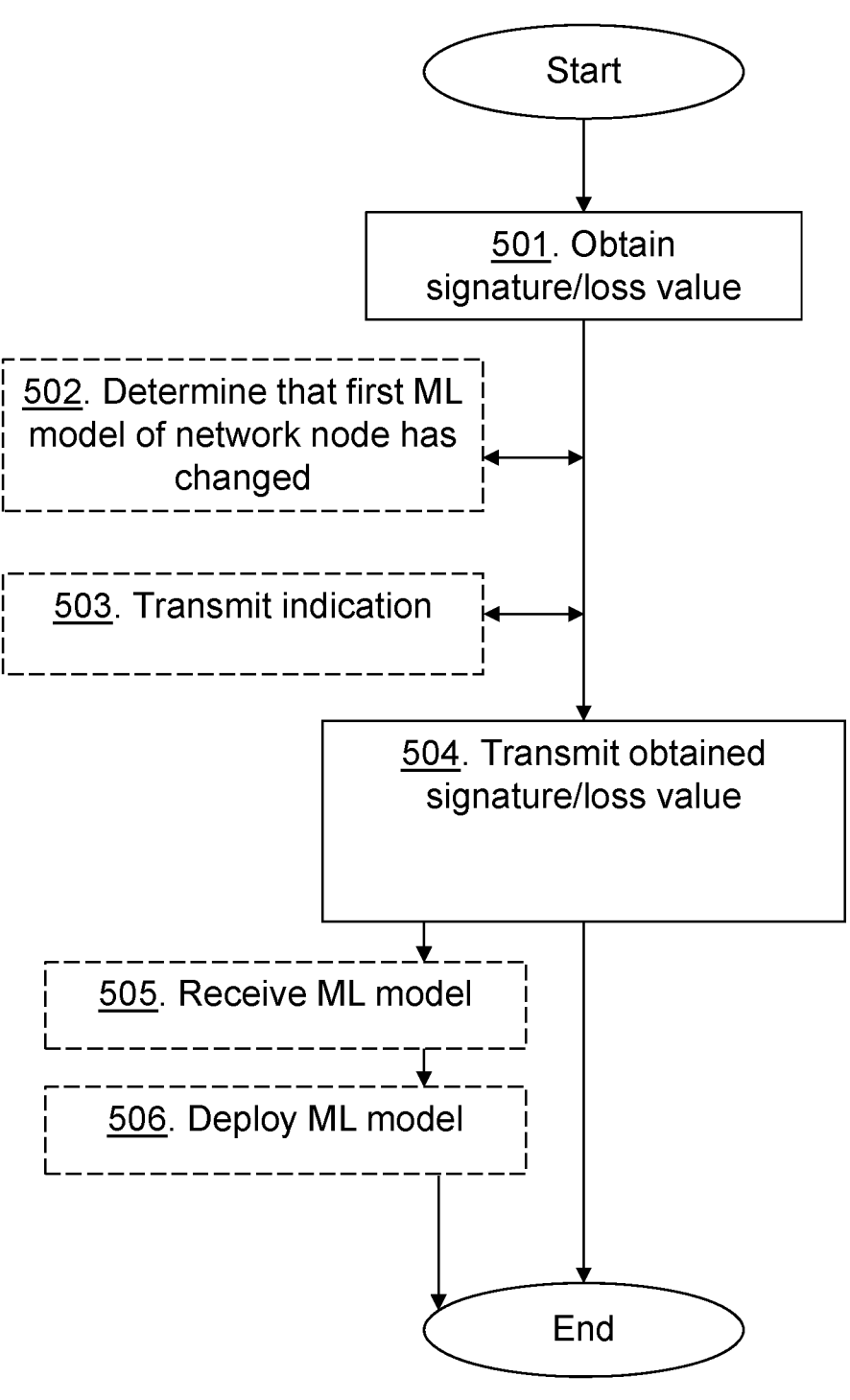
FIG. 5 is a flowchart depicting a method performed by a network node according to embodiments herein.

The method actions performed by the network node such as the first or the second network node in the communications network for handling ML models in the communications network comprising one or more network nodes according to embodiments herein will now be described with reference to a flowchart depicted in FIG. 5. The actions do not have to be taken in the order stated below, but may be taken in any suitable order. Actions performed in some embodiments are marked with dashed boxes.

Action 501. The network node obtains the signature and/or the loss value of the network node, wherein the signature and/or the loss value is related to the first ML model comprised in the network node.

Action 502. The network node may determine that the first ML model of the network node has changed based on the obtained signature and/or the loss value to the control network node 14.

Action 503. The network node may further transmit the indication to the control network node 14 that the first ML model of the network node has changed. The indication may be a flag indication.

Action 504. The network node transmits the obtained signature and/or the loss value to the control network node 14 in the communications network. It should be noted that the indication, the signature and/or the loss value may be transmitted in one or more messages.

Action 505. The network node may receive a ML model, i.e. a selected ML model, from the control network node 14.

Action 506. The network node may further deploy the received ML model at the network node 14 and may further (re-)train the received ML model.

The network nodes e.g. individual clients or nodes are the network nodes at e.g., the edge, such as base stations, where collection of data, and the actual training, and inference on local ML models is performed. Each network node may calculate loss value (L) which is the error or loss in inference; shortly, a distance or difference between the inferred value and the actual value. Some candidates are Mean Squared Error (MSE), Mean Absolute Error (MAE) if it is a regression problem, and logloss if the problem is a multi-classification. The network nodes runs inference with the locally deployed ML model on the data, and the difference between the predicted and the actual value is reported as L. Each network node may also compress the collected data via Principal Component Analysis (PCA) or Autoencoder and may send the compressed form of the input data, i.e. the signature, to a change detector node. Additionally, the loss value from the first ML model, which is currently running at the network node, may also be sent to the change detector node. It should be noted that the change detector node may be comprised in the control network node 14, a standalone network node or be a part of the network node such as the first network node 10.

Thus, the change detector node may detect a variance in the input dataset for each network node, and may append the indication such as a flag based on the decision of the detector as either "change detected: 1", or "no change detected: 0". This flag reduces the overhead (extra computation) at the control network node in computation of signature similarity from different network nodes. In addition, if the data has arrived from an unknown (newly registered) network element, it detects this element as new. The change detection may function as follows:

Reception of compressed input data, wherein the change detector node receives the encoded form of the data from all network nodes, i.e., the output of the consistent encoder ML model at every network node together with e.g. a source node address;

Reconstruction, wherein the change detector node then decodes received data and reconstructs the data. To reconstruct, the change detector may also need to know the decoder network architecture;

Detection of a new or changed network node. The similarity of the reconstructed data is checked in order to test whether a reconstructed distribution is statistically significantly different than the prior reconstructed distribution. Also, its detected if a new node has communicated to the detector, i.e., if the compressed data has arrived from a source address that has not been registered earlier. Moreover, a significant increase in the loss value for a model can indicate a change in data which has led to degradation in model performance.

The comparison of data distribution i.e. the signature/loss value comparison, may be done by a change detector module in multiple ways depending on whether the change detector is deployed as a distributed way or not.

A centralized change detector module works as follows:

Train a centralized ML model, e.g., XGBoost, or Random Forest are good candidates, with the corresponding name of the source as a target variable (label). In this way, the ML model learns the mapping between the data samples and the node from which they originated. Then, during the inference phase, the ML model executes inference on each sample received from each node and estimates the probability for each possible node that the data might be coming from.

Training:

Sample 1: column1; column2; . . . , column X; NodeA

Sample 2: column1; column2; . . . , column X; NodeB

. . .

Sample N: . . .

The columns can here be either raw features or some aggregated form (descriptive statistics) of the raw data at the edge (e.g., min, max, stdev, $99^{th}$ percentile, $1^{st}$ percentile, median, mean, etc. . . . ).

Inference:

Then in the inference phase for each new sample arriving from any known node look at the inference results, for example, if the model's estimated probabilities are: {NodeA: 0.1, NodeB: 0.1, NodeC: 0.4, NodeD: 0.1, NodeE: 0.2, NodeF: 0.1}, then according to the supervised ML model, the data sample is estimated to be most likely being received from NodeC.

Compare the estimated class, i.e., NodeC in the example here, (with highest probability) with the actual name of the node that the data is received (as the detector keeps track of which data is being received from which source node). If the estimated class by the ML model is the same as the actual class, i.e., if the estimation is correct, then the detector does not detect a change, if the estimation is incorrect, that indicates that there are some changes in the data distribution at the source node, and this will be forwarded to the Node Signature DB for the source node to update its model to the most similar model that would serve from now on under the changed conditions/state.

If the change detector module is decentralized and distributed (e.g. runs in the edge), then it may work as follows:

Keep a distribution of all reconstructed samples for each column (feature) received at the change detector module from each node in every reception updated with new data.

Keep in buffer of the change detector module a few recently received samples (last n samples), and then the distribution of features/columns can be computed.

Apply Kolmogorov-Smirnov test to estimate or to detect the distance between the new sample distribution and the existing distribution. This will be executed on all features and based on the accumulated distance with a predefined threshold distance value for each feature, the decision (data changed/data not changed) will be given. The criteria can for example be changed, if over 10% of the features are statistically significantly different from their corresponding existing distribution.

Pairwise distribution similarity execution is not expected to be heavy which is good as the computation will be running on the edge for each edge node (network element/source), thus in a distributed manner. This way, no data needs to be sent to the centralized node which would also address privacy issues.

The change detector module may forward the Loss (L), and the compressed form of input matrix (if detector is deployed as centralized), and the detection flag to a centralized model database of the control network node. The centralized model database then keeps the signatures (e.g. PCA models in the case of centralized or encoded representation of each dataset in the case of distributed) as a library. It runs clustering algorithm periodically and compute the differences in between the data signatures from various network nodes. Ideally each network node is assigned to one machine learning model cluster. The newly added network node or the network node where the change is detected will deploy the ML model that has the signature with the closest distance.

The control network node may perform a similarity calculation. The similarity in between the network node (e) is computed by comparing the data from that node (e) to all available nodes, and if a new network node is added to the communication network then a model (M) that was pre-trained on the most similar (with respect to the collected data) e' in the past (amongst the already existing nodes) is deployed. The similarity is calculated either by pairwise chi-square comparison test on the distribution (histogram) of data collected at every node, or by other clustering methods such as Meanshift or Hierarchical Density-Based Spatial Clustering of Applications with Noise (HDBSCAN).

In every change in the system with respect to adding/removing/modifying nodes, the pair wise similarity of the nodes or the clusters (based on the input data) are recomputed as a change in one element in the cluster or in the pool of network nodes might change the thresholds. This keeps the similarity up to date and helps to choose eventually the nearest model.

Figure 6:
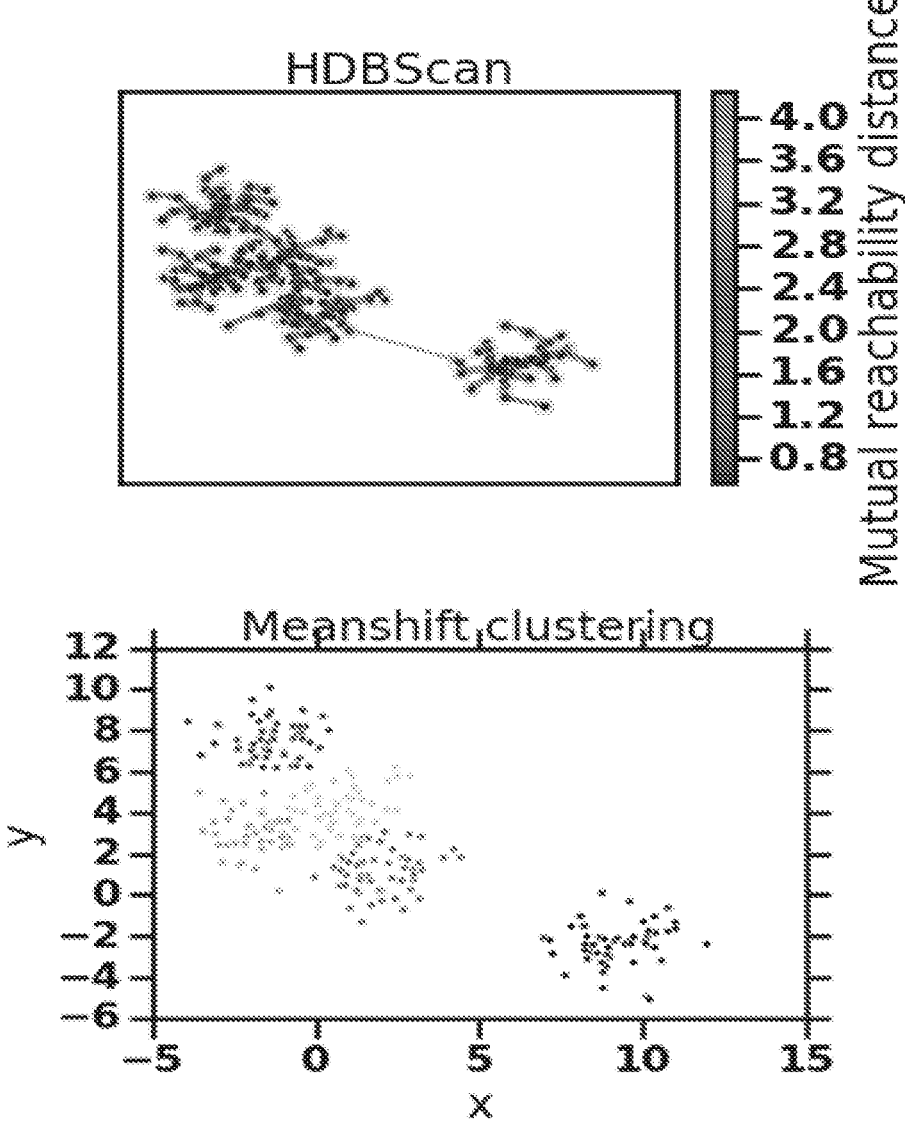
FIG. 6 is a schematic view depicting similarity calculations according to embodiments herein.

Suppose each point in FIG. 6 represents a unique network element in the network. The points are depicted based on the network elements representation in space. Just for visualisation purposes, the dimension is reduced to 2D. Based on the distance of those nodes in space in the whole network space, clusters of network elements are obtained. Clustering of nodes (5 clusters in this example) by using two different clustering algorithms, HDBSCAN and Meanshift, are depicted in FIG. 6. In Bandwidth and the minimum cluster size are hyperparameters that needs to be set for the Meanshift and HDBSCAN models during training, respectively. Once a new network node is added to the network, one more point will be added to the space, and a ML model that is running in its closest cluster point will be assigned to this network node. In cases when several cluster points are found an additional analysis can be applied to detect what ML model should be chosen for the new/modified element. This can be done using Principal Component Analysis (PCA) fit on the data from neighbour points. The ML model should be chosen based on the same number of the PCA components covering e.g. 95% of the data variability and the same features contribution to these PCA components. Additional way of detecting the most similar point can be tests of the PCA transform trained on the neighbour's data on the available data from the new network node. This way, the network element will be able to run with the machine learning model within a shorter time since the time it is deployed.

Embodiments herein may be implemented in a very familiar scenario in an industrial setting such as underground mine or an open pit where production work is ongoing with the high-tech machinery and vehicles are making use of network connectivity provided by 5G for example to do the remote vehicle control, remote operation of mining equipment to avoid dangerous situation and so on. In such scenarios various video and other time-critical services use the cellular network. ML technology can be used in such scenarios for proactive service assurance to predict any possible network throughput problem, signal strength issues etc. before they occur to avoid the dangerous or difficult situations.

However, the whole production area is in most cases not possible to cover by one cell so multiple cell and/or radio dots are deployed to cover the whole area of activity with multiple radio cells. However, in most cells the traffic patterns do not significantly differ from each other at least in most time-periods of the day. So there is a high possibility of dynamically adopting ML models using embodiments herein for making performance forecasting in different cell of radio coverage area. This also avoids the problem of excessive measurement collection overhead in all cells as well as training overhead.

Another scenario is pertaining to the training of models for IPTV streaming Quality of Experience (QoE), where data is acquired from set-top boxes and wifi routers at user end (homes). The models that are trained on data collected from home devices are often better in estimating and predicting the streaming quality perceived by the user, as a significantly large number of performance issues occur due to connectivity problems at home. However, often these devices go offline and become inactive as users may switch these devices off. Consequently, enough data is not available to train separate models for individual users. To mitigate this issue, the above-described solution can be built on the data available from different users and can be used to estimate and predict QoE of users, where required datasets from wifi devices and set-top boxes are available only for short intervals of time.

Figure 7:
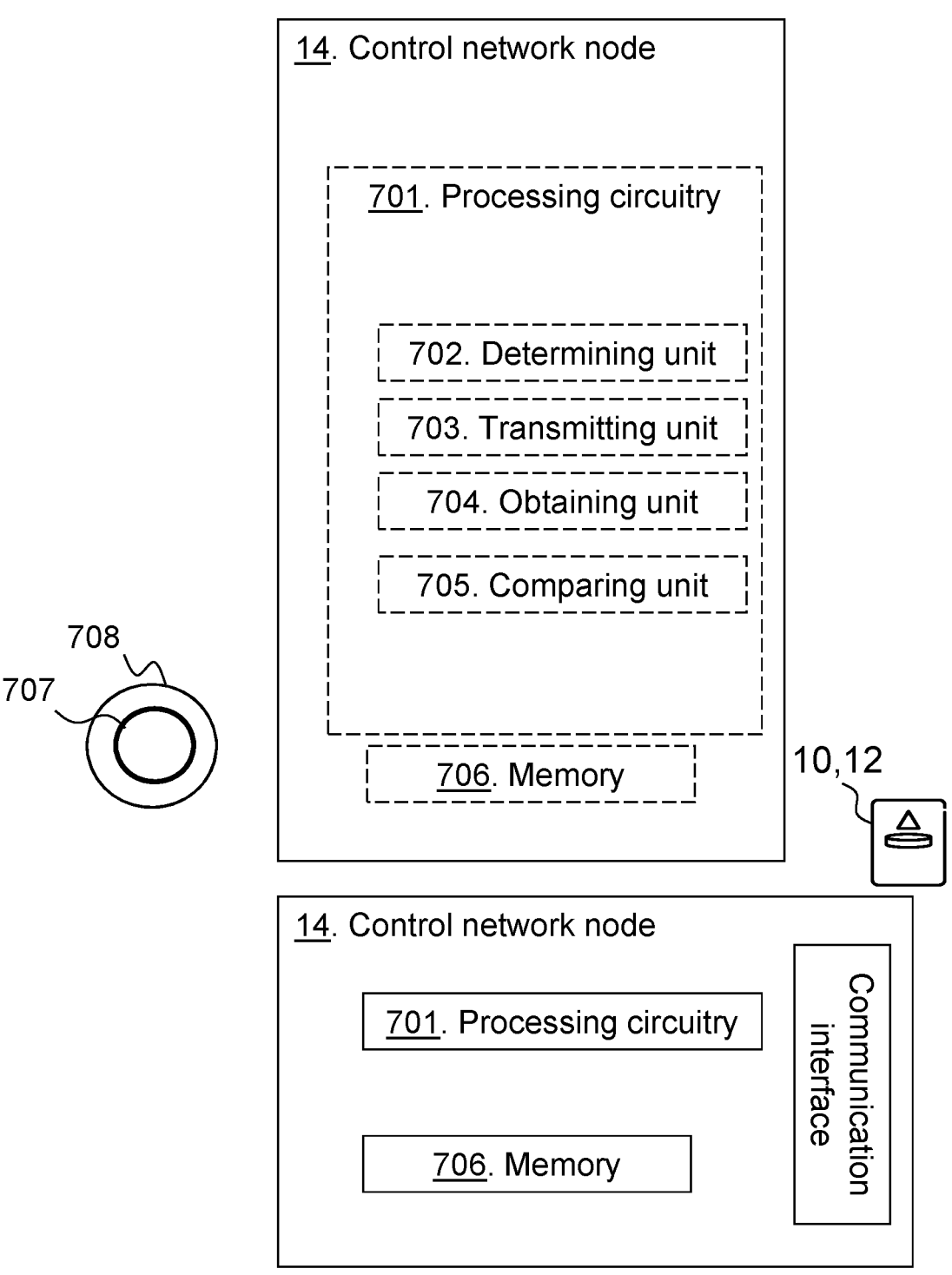
FIG. 7 is a block diagram depicting a control network node according to embodiments herein.

FIG. 7 is a block diagram depicting a control network node 14 for handling ML models in the communications network 100 according to embodiments herein.

The control network node 14 may comprise processing circuitry 701, e.g. one or more processors, configured to perform the methods herein.

The control network node 14 may comprise a determining unit 702. The control network node 14, the processing circuitry 701, and/or the determining unit 702 is configured to determine whether or not to transmit to the network node, such as the first and/or the second network node 12, in the communications network 100 the ML model based on the signature and/or the loss value of the network node.

The control network node 14 may comprise a transmitting unit 703. The control network node 14, the processing circuitry 701, and/or the transmitting unit 703 is configured to, in case determined to transmit the ML model, transmit the ML model to the network node. The control network node 14, the processing circuitry 701, and/or the determining unit 702 may be configured to determine that the network node is a network node added to the communications network, and the ML model to be transmitted to network node is selected based on the signature of the network node.

The control network node 14 may comprise an obtaining unit 704. The control network node 14, the processing circuitry 701, and/or the obtaining unit 704 may be configured to obtain the signature of the network node. The control network node 14, the processing circuitry 701, and/or the obtaining unit 704 may be configured to obtain the indication that the first ML model of the network node has changed. The indication may be the received flag indication from another network node in the communications network.

The control network node 14 may comprise a comparing unit 705. The control network node 14, the processing circuitry 701, and/or the comparing unit 705 may be configured to compare the obtained signature with one or more stored signatures. The control network node 14, the processing circuitry 701, and/or the determining unit 702 may be configured to select the ML model based on the comparison, wherein the selected ML model is the most similar ML model in terms of signature from the one or more stored signatures compared to the obtained signature of the network node 10,12.

The control network node 14 further comprises a memory 706. The memory 706 comprises one or more units to be used to store data on, such as signatures, loss values, applications to perform the methods disclosed herein when being executed, and similar. The control network node 14 may further comprise a communication interface comprising e.g. one or more antenna or antenna elements.

The methods according to the embodiments described herein for the control network node 14 are respectively implemented by means of e.g. a computer program product 707 or a computer program, comprising instructions, i.e., software code portions, which, when executed on at least one processor, cause the at least one processor to carry out the actions described herein, as performed by the control network node 14. The computer program product 707 may be stored on a computer-readable storage medium 708, e.g. a disc, a universal serial bus (USB) stick or similar. The computer-readable storage medium 708, having stored thereon the computer program product, may comprise the instructions which, when executed on at least one processor, cause the at least one processor to carry out the actions described herein, as performed by the control network node 14. In some embodiments, the computer-readable storage medium may be a transitory or a non-transitory computer-readable storage medium.

Figure 8:
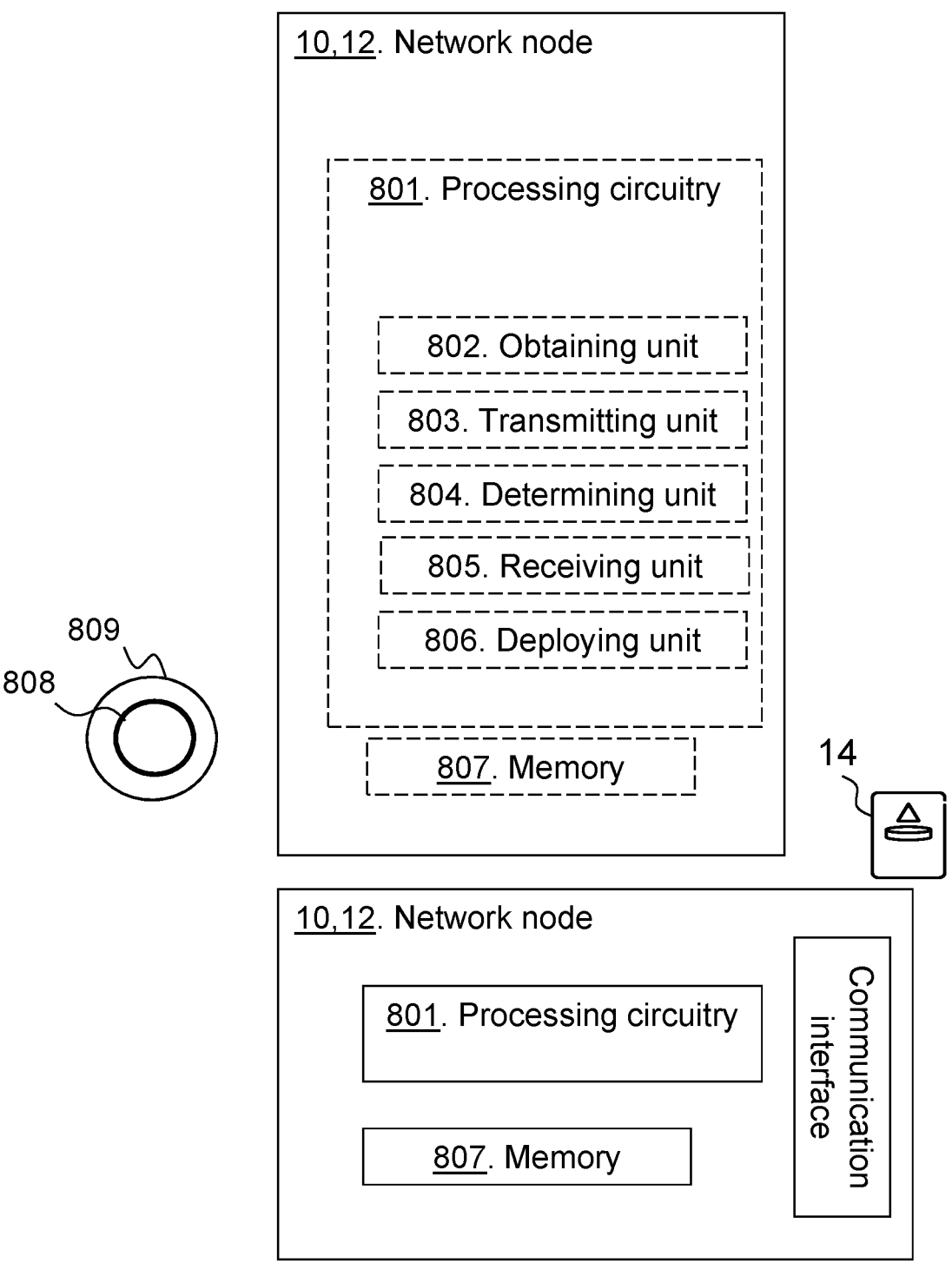
FIG. 8 is a block diagram depicting a network node according to embodiments herein.

FIG. 8 is a block diagram depicting a network node, such as the first network node and/or the second network node 12, for handling ML models in a ML model architecture according to embodiments herein.

The network node may comprise processing circuitry 801, e.g. one or more processors, configured to perform the methods herein.

The network node may comprise an obtaining unit 802. The network node, the processing circuitry 801, and/or the obtaining unit 802 is configured to obtain the signature and/or the loss value of the network node, wherein the signature and/or the loss value is related to the first ML model comprised in the network node.

The control network node 14 may comprise a transmitting unit 803. The network node, the processing circuitry 801, and/or the transmitting unit 803 is configured to transmit the obtained signature and/or the loss value to the control network node 14 in the communications network.

The network node may comprise an determining unit 804. The network node, the processing circuitry 801, and/or the determining unit 804 may be configured to determine that the first ML model of the network node has changed based on the obtained signature and/or the loss value to the network node 14. The network node, the processing circuitry 801, and/or the transmitting unit 803 may be configured to transmit the indication to the control network node 14 that the first ML model of the network node has changed. The indication may be the flag indication.

The network node may comprise a receiving unit 805. The network node, the processing circuitry 801, and/or the receiving unit 805 may be configured to receive the ML model from the control network node 14.

The network node 14 may comprise a deploying unit 806. The network node, the processing circuitry 801, and/or the deploying unit 806 may be configured to deploy the received ML model at the network node.

The network node further comprises a memory 807. The memory 807 comprises one or more units to be used to store data on, such as signatures, loss values, applications to perform the methods disclosed herein when being executed, and similar. The network node may further comprise a communication interface comprising e.g. one or more antenna or antenna elements.

The methods according to the embodiments described herein for the network node are respectively implemented by means of e.g. a computer program product 808 or a computer program, comprising instructions, i.e., software code portions, which, when executed on at least one processor, cause the at least one processor to carry out the actions described herein, as performed by the network node. The computer program product 808 may be stored on a computer-readable storage medium 809, e.g. a disc, a universal serial bus (USB) stick or similar. The computer-readable storage medium 809, having stored thereon the computer program product, may comprise the instructions which, when executed on at least one processor, cause the at least one processor to carry out the actions described herein, as performed by the network node. In some embodiments, the computer-readable storage medium may be a transitory or a non-transitory computer-readable storage medium.

Embodiments herein enable seamless handover of already trained ML models to most suitable environments for rapid inference tasks, where multiple network nodes are involved. Proposed solution encourages the reuse of already trained ML models for the newly added or modified network nodes in the communication network. To realize this, embodiments herein disclose on change detection and a similarity check using a stored signatures.

When using the word "comprise" or "comprising" it shall be interpreted as non-limiting, i.e. meaning "consist at least of".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a control network node in a communications network for handling machine learning, ML, models in the communications network comprising one or more network nodes, the method comprising:

obtaining, from a network node, an indication that the network node has experienced a change in the running of a first ML model in the network node, the indication being based on an increase in a loss value of the first ML model that indicates a change in input data to the first ML model;

determining to transmit to a network node in the communications network a pre-trained ML model, based on at least one of a signature and a loss value of the network node, the at least one of the signature and the loss value being related to ML modelling;

obtaining a signature of the network node from the network node, the signature being related to the first ML model and comprising a Gaussian model of all features the first ML model uses as input;

determining a similarity between the signature of the first ML model with one or more stored signatures by comparing the obtained signature of the first ML model with the stored signatures, the similarity being determined based on pairwise distance models;

selecting the pre-trained ML model having a signature most similar to the signature of the first ML model; and transmitting the pre-trained ML model to the network node.

2. The method according to claim 1, further comprising:

determining that the network node is an added network node added to the communications network; and the pre-trained ML model transmitted to the network node is selected based on the signature of the network node.

3. The method according to claim 1, wherein the indication is a received flag indication from another network node in the communications network.

4. A method performed by a network node in a communications network for handling machine learning, ML, models in the communications network comprising one or more network nodes, the method comprising:

obtaining at least one of a signature and a loss value of the network node, the at least one of the signature and the loss value being related to a first ML model comprised in the network node and comprising a Gaussian model of all features the first ML model uses as input;

determining that the network node has experienced a change in the running of a first ML model in the network node based on an increase in a loss value of the first ML model that indicates a change in input data to the first ML model;

transmitting an indication to a control network node indicating that the network node has experienced the change in the running of the first ML model;

transmitting the obtained at least one of the signature and the loss value to a control network node in the communications network;

receiving a pre-trained ML model having a signature most similar to the signature of the first ML model, the pre-trained ML model having been selected based on a similarity between the signature of the first ML model with one or more signatures based on a comparison of the obtained signature of the first ML model with the signatures, the similarity being determined based on pairwise distance models; and deploying the pre-trained ML model at the network node.

5. The method according to claim 4, wherein the indication is a flag indication.

6. A control network node for handling machine learning, ML, models in a distributed ML model architecture, the control network node configured to:

obtain, from a network node, an indication that the network node has experienced a change in the running of a first ML model in the network node, the indication being based on an increase in a loss value of the first ML model that indicates a change in input data to the first ML model;

determine to transmit to a network node in a communications network a pre-trained ML model based on at least one of a signature and a loss value of the network node, the at least one of the signature and the loss value being related to ML modelling;

obtain a signature of the network node from the network node, the signature being related to the first ML model and comprising a Gaussian model of all features the first ML model uses as input;

determine a similarity between the signature of the first ML model with one or more stored signatures by comparing the obtained signature of the first ML model with the stored signatures, the similarity being determined based on pairwise distance models;

select the pre-trained ML model having a signature most similar to the signature of the first ML model; and transmit the ML model to the network node.

7. The control network node according to claim 6, wherein the control network node is configured to determine that the network node is an added network node added to the communications network; and The pre-trained ML model transmitted to the network node is based on the signature of the network node.

8. The control network node according to claim 6, wherein the indication is a received flag indication from another network node in the communications network.

9. A network node for handling machine learning, ML, models in a ML model architecture, wherein the network node is configured to:

obtain at least one of a signature and a loss value of the network node, the at least one of the signature and the loss value being related to a first ML model comprised in the network node and comprising a Gaussian model of all features the first ML model uses as input;

determine that the network node has experienced a change in the running of a first ML model in the network node based on an increase in a loss value of the first ML model that indicates a change in input data to the first ML model;

transmit an indication to a control network node indicating that the network node has experienced the change in the running of the first ML model;

transmit the obtained at least one of the signature and the loss value to a control network node;

receive a pre-trained ML model having a signature most similar to the signature of the first ML model, the pre-trained ML model having been selected based on a similarity between the signature of the first ML model with one or more signatures based on a comparison of the obtained signature of the first ML model with the signatures, the similarity being determined based on pairwise distance models; and deploy the pre-trained ML model at the network node.

10. The network node according to claim 9, wherein the indication is a flag indication.

* * * * *